United States Patent [19]

Al Ghatta

[11] Patent Number: 4,764,323
[45] Date of Patent: Aug. 16, 1988

[54] METHOD OF TREATING HOLLOW ARTICLES, IN PARTICULAR POLYETHYLENE TEREPHTHALATE PREFORMS

[75] Inventor: Hussain A. Al Ghatta, Fiuggi, Italy

[73] Assignee: Cobarr S.p.A., Anagni, Italy

[21] Appl. No.: 929,428

[22] Filed: Nov. 12, 1986

[30] Foreign Application Priority Data

Nov. 19, 1985 [IT] Italy .................................. 22898 A/85

[51] Int. Cl.⁴ .................. B29C 71/00; C08J 7/12; C08J 7/02
[52] U.S. Cl. ........................................ 264/85; 264/83; 264/532; 264/234; 264/344; 525/383; 525/437; 528/308.2
[58] Field of Search .................. 264/82, 83, 85, 232, 264/234, 235, 340, 344, 345, 532; 528/308.2; 525/383, 437

[56] References Cited

U.S. PATENT DOCUMENTS 4,260,567  4/1981  Poppe et al. ................. 264/235 X

FOREIGN PATENT DOCUMENTS 59-219328  12/1984  Japan .

*Primary Examiner*—Jan H. Silbaugh
*Assistant Examiner*—Neil M. McCarthy
*Attorney, Agent, or Firm*—Hedman, Gibson, Costigan & Hoare

[57] ABSTRACT

A method of treating PET preforms and bottles consists of subjecting the preforms or the bottles to a carbon dioxide atmosphere at a higher temperature than the critical temperature of carbon dioxide, a higher pressure than ambient pressure, and for a set time period. The treatment reduces the acetaldehyde concentration in the head of the treated bottles or in the bottles obtained from the treated preforms by stretch-blowing, and also reduces the permeability of gases through the bottle walls.

10 Claims, 1 Drawing Sheet

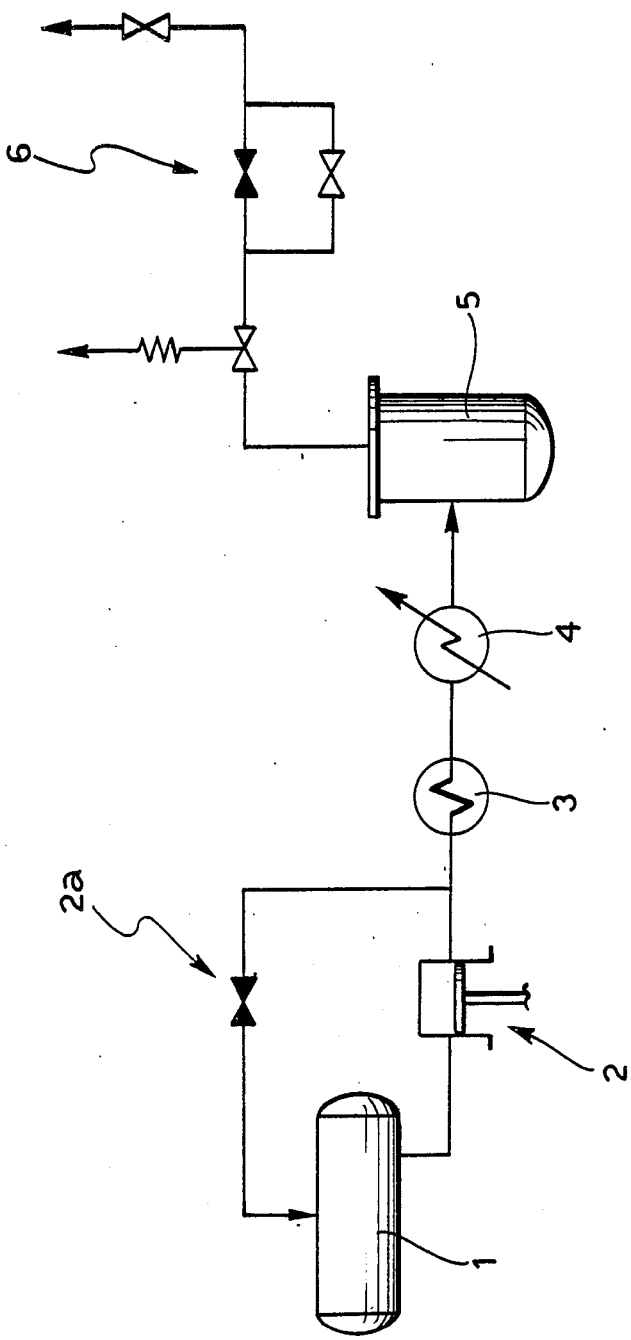

METHOD OF TREATING HOLLOW ARTICLES, IN PARTICULAR POLYETHYLENE TEREPHTHALATE PREFORMS

DESCRIPTION

This invention relates to a method of treating polyester hollow articles, in particular polyethylene terephthalate articles, such as preforms for use to make bioriented containers by stretch-blowing the preforms, or bioriented containers obtained from untreated preforms.

Such containers include walls having an acetaldehyde concentration which can be determined by testing for diffusion of the acetaldehyde from the walls toward the interiors of the containers, such tests being normally carried out directly after stretch-blowing the preforms. The acetaldehyde contained in the wall originates primarily from the thermal degradation undergone by the polymer during the preform injection molding step. The method followed for said test, better known as the "head space method", consists of flushing the container interiors, after the preform stretch-blowing step, with an inert gas, thereafter the containers are sealed and stored in set conditions for a given time period, usually 24 hours at a temperature of 20° C. Then, the content in acetaldehyde within the container is measured based on the container volume, and the test result is expressed as $\mu g/l$ acetaldehyde.

It has been found that the acetaldehyde content, as determined inside the containers by the head space method, is directly proportional to the acetaldehyde concentration in the container walls, and that the rate of diffusion of the acetaldehyde from the walls is a characteristic which depends on the surface area-to-volume volume ratio of the containers.

The limit value of the acetaldehyde concentration in beverages packed in PET bottles is determined through subjective evaluation of the product taste to be conducted on different person panels, which enables assessment of the effects brought about by minimal amounts of acetaldehyde on the organoleptic characteristics of the products. As an example, carbonated mineral water is the liquid product which is most affected by acetaldehyde, having a limit value varying from 30 to 40 ppB; with flat water, the limit value would vary from 40 to 60 ppB, and with soft drinks the limit value would lay between 60 to 100 ppB.

From the above-described organoleptic analyses, it appears that to achieve comparable performance to glass containers as relates to the absence of effect on the taste of the packed products, the acetaldehyde concentration in the container walls should be lower than 5 ppm (i.e. below 1.5 $\mu g/l$) acetaldehyde according to the head space method and for containers with a 1.5 liters capacity).

Containers obtained with conventional techniques seldom have walls with acetaldehyde concentrations so low as to have no effect on the organoleptic characteristics of the products packed therein.

Another problem of bioriented containers, and especially bottles for carbonated beverages, relates to the permeability of the gas through the bottle walls, which determines the so-called "shelf life" of the package, that is the longest storage time that a package can accept without its contents losing its original characteristics to any appreciable extent, in this specific case, its carbon dioxide content.

It is an object of this invention to provide a method of treating either preforms or bioriented bottles obtained from untreated preforms, which can overcome both the above problems (acetaldehyde content and permeability) while being simple and inexpensive to apply.

According to the invention, this object is achieved by a method which comprises the step of treating said hollow articles in an atmosphere containing carbon dioxide at a partial pressure in excess of 2 bars, at a temperature above the critical temperature for carbon dioxide (31° C.) for a time period suiting the treatment pressure and temperature conditions, and in any case adequate to produce the target decrease in the acetaldehyde concentration within bottles.

The treatment temperature is preferably between 31° C. and 90° C. and said atmosphere comprises preferably carbon dioxide saturated with steam.

As a result of the treatment according to the present invention, the content in acetaldehyde inside the containers formed from the treated preforms by stretch-blowing is at all times lower than 2 $\mu g/l$ (method of the head space and diffusion time 24 hours at 20° C.), and in any case such as to exert no influence on the organoleptic characteristics of such easily affected products as carbonated mineral water. The same results are achieved by treating the containers formed from untreated preforms. Further, the low permeability to gases either of the containers obtained from treated preforms or of the treated containers obtained from untreated preforms affords longer shelf-life of the products packed therein.

Of preference, the treatment temperature is within the range of 45° to 80° C., and the treatment pressure above 50 bars.

Further advantages and features of the method according to the invention will become apparent from the description and examples that follow, given herein by way of non-limitative example with reference to the accompanying drawing which shows diagramatically a plant layout for implementing the inventive method.

BRIEF DESCRIPTION OF THE DRAWING

The sole drawing FIGURE is a schematic representation of the apparatus used to carry out a method according to the invention.

With reference to the drawing, the numeral 1 designates a pressurized storage tank for liquid carbon dioxide. The latter would be fed into an autoclave 5 by a pump 2 bypassed as at 2a to control its delivery rate. Interposed serially to the pump 2 and autoclave 5 are a vaporizer 3 and heat exchanger 4 for raising the temperature of the carbon dioxide stream fed into the autoclave 5 to a level in the 25° to 90° C. range. The internal pressure of the autoclave 5, which has been previously loaded with hollow articles (not shown), varies between 50 to 100 bars. The internal pressure of the autoclave 5 and the flow rate of the stream of carbon dioxide issuing from the autoclave 5 are controlled by a regulator unit, generally designated with the reference numeral 6. The treatment duration varies between 5 minutes and 10 hours, depending on the temperature and pressure inside the autoclave 5.

EXAMPLES 1-10

A pilot plant was employed which was quite similar to that shown in the accompanying drawing. For the liquid carbon dioxide delivery pump, a pump of the SACCAB type was used which has a top delivery pressure of 90 bars, a delivery rate of 200 kg/hour, and a power rating of 3 KW. For the carbon dioxide vaporizer, a vaporizer of the HP6 type was used which has a power rating of 6 KW and can vaporize about 70 kg/hour of carbon dioxide. An autoclave was employed which has a 14-liter internal volume and which was loaded with forty 49 g PET preforms for testing (preforms for 1.5-liter capacity bottles).

Ten test passes were carried out at different pressures of the carbon dioxide within the autoclave, carbon dioxide flow rates, treatment temperatures and durations, while analyzing the amount of carbon dioxide absorbed in the preforms, and following stretch-blowing of the preforms to obtain bioriented bottles of 1.5-liter capacity on a machine of the KRUPP CORPOPLAST B 80 type, also the content in acetaldehyde diffused within the bottles at the end of a storage period of 24 hours at room temperature (method of the head space). For comparison purposes, the same tests were carried out on bottles obtained from preforms which had not been treated according to the invention.

The test result are summarized in the following chart:

| Test No. | $CO_2$ pressure (bar) | $CO_2$ flow rate (kg/g) | Treatment temperature (°C.) | Treatment duration (hours) | $CO_2$ absorbed by the preforms (mg) | Acetaldehyde concentration within 1.5 l bottles (μg/l) | Acetaldehyde concentration in reference bottles (μg/l) |
|---|---|---|---|---|---|---|---|
| 1 | 59 | 6 | 60 | 2 | 166 | 2.0 | 3.7 |
| 2 | 57 | 6 | 70 | 2 | 183 | 1.19 | 3.7 |
| 3 | 60 | 6 | 75 | 2 | 200 | 1.1 | 3.7 |
| 4 | 60 | 6 | 80 | 0.25 | 61.1 | 1.78 | 3.7 |
| 5 | 63 | 6 | 80 | 1.0 | 136 | 1.1 | 3.7 |
| 6 | 58 | 12 | 50 | 4 | 248 | 0.7 | 3.7 |
| 7 | 56 | 12 | 60 | 4 | 277 | 1.6 | 3.7 |
| 8 | 56 | 12 | 70 | 4 | 264 | 1.14 | 3.7 |
| 9 | 80 | 12 | 70 | 0.2 | 170 | 1.28 | 3.7 |
| 10 | 80 | 12(1) | 70 | 2 | 274 | 1.1 | 3.7 |

(1) Stream of water-saturated $CO_2$ at 20° C.

As may be seen, the contents in acetaldehyde inside the bottles are surprisingly lower than 2 μg/l at all times.

EXAMPLES 11-12

The content in acetaldehyde of the walls of bioriented bottles of 1.5 l capacity as obtained from preforms treated in two different conditions was determined (utilizing the same pilot plant as in Examples 1-10) in comparison with the acetaldehyde content of walls of bottles obtained from untreated preforms. The conventional method of discontinuos gas extraction was used as developed by Kolb (Chromatographia, Vol. 10, No. 12, pages 707-711) which will be presently reviewed briefly.

A rectangular sample from a bottle wall (measuring 2×30 mm) is placed inside a U-bent, thermostatically controlled glass tube (having a length of 18 cm and an inside diameter of 2.5 mm). The glass tube is connected to tubing for the carrier gas and equipped with valves enabling the gas to flow through the tube and bypass it.

The sample tube is also connected, at a downstream location, to a gas chromatographic column for quantitative analysis of the extracted acetaldehyde.

A Carlo Erba Model HRGC 5300 Gc gas chromatograph was used having a flame ionization detector connected to an integrator of peak areas Model Sp 2470—Mega Series Integrator. A gas chromatographic column of the POROPAK Q 80-100 Mesh was used measuring 1m in length and 0.3 cm in inside diameter, and the analysis was carried out in the following conditions:

Column temeperature: 110° C.
Carrier gas: nitrogen
Carrier gas pressure: 60 KPa
FID temperature: 200° C.
FID range: ×1

The following procedure was used to extract the acetaldehyde from the wall sample.

The sample tube is heated for 15 minutes at 140° C. and the volatiles inside the tube are entrained by the carrier gas to the gas chromatographic column. After 60-minute flowing through the sample tube, the latter is bypassed by the carrier gas, and the glass tube is again heated at 140° C. for 15 minutes. This same extraction procedure was gone through again five times to yield the overall amount of acetaldehyde extracted from the sample.

The following chart shows the values obtained.

| Test No. | 11 | 12 | Reference |
|---|---|---|---|
| Conditions for $CO_2$ treating the preforms: | | | |
| (a) $CO_2$ flow rate (kg/hour) | 12 | 12 | — |
| (b) Treatment pressure (kg/cm²) | 75 | 75 | |
| (c) Treatment temperature (°C.) | 50 | 55 | |
| (d) Treatment duration (hours) | 2.0 | 2.0 | |
| $CO_2$ adsorbed per preform (mg) | 280 | 280 | |
| Concentration of acetaldehyde in the walls of PET bottles (ppm) | 1.89 | 1.97 | 4.5 |

EXAMPLES 13-16

Tests for permeability to oxygen of bioriented bottles obtained from PET preforms treated through the plant used in the previous Examples were performed and compared with bottles obtained from conventional preforms.

The equipment employed for analysis was of the OXO TRAN-100 type, manufactured and sold by MOCON, Modern Controls, Inc., Minneapolis, USA.

The test temperature was 23° C., and the bottles were flushed with nitrogen for 24 hours prior to carrying out the oxygen permeability test, whose results are shown in the following chart.

| Test No. | 13 | 14 | 15 | 16 | Reference |
|---|---|---|---|---|---|
| Conditions for | | | | | |

-continued

| Test No. | 13 | 14 | 15 | 16 | Reference |
|---|---|---|---|---|---|
| $CO_2$ treating the preforms: | | | | | |
| (a) $CO_2$ flow rate (kg/hour) | 6 | 6 | 12 | 12 | |
| (b) Treatment pressure (kg/cm$^2$) | 60 | 63 | 58 | 80 | |
| (c) Treatment temperature (°C.) | 75 | 80 | 50 | 50 | |
| (d) Treatment duration (hours) | 2 | 1 | 4 | 2 | |
| $CO_2$ adsorbed per preform (mg) | 200 | 136 | 248 | 296 | |
| Permeability to $O_2$ of 1.5 l PET bottles (cm$^3$/bottle day) | 0.19 | 0.22 | 0.23 | 0.177 | 0.345 |

EXAMPLES 17–18

Test were carried out on bioriented PET bottles obtained from preforms treated with the method of this invention in the same plant as used in the previous Examples for the purpose of determining their so-called $CO_2$ shelf life, as defined by the time period over which the product loses 15% of its original $CO_2$ content. The containers were kept at a temperature of 22° C.±1° C.

As can be taken from the following chart, the containers obtained from treated preforms afforded increased shelf life of the product.

| Test No. | 17 | 18 | Reference |
|---|---|---|---|
| Conditions for $CO_2$ treating the preforms: | | | |
| (a) $CO_2$ flow rate (kg/hour) | 12 | 12 | |
| (b) Treatment pressure (kg/cm$^2$) | 80 | 75 | |
| (c) Treatment temperature (°C.) | 50 | 55 | |
| (d) Treament duration (hours) | 2 | 2.5 | |
| $CO_2$ adsorbed per preform (mg) | 296 | 251 | |
| $CO_2$ shelf life for 1.5 l containers (weeks) | >16 | >16 | 16 |

Furthermore, differential thermal analyses were carried out on sample walls from container obtained from treated preforms, as well as controlled heating tests on such samples to determine their dimensional stability as temperature changes (shrinkage effects following heat application).

The results of such tests reveal higher crystallinity and biorientation in comparison with the containers obtained from conventional preforms.

These results bring out an ability of containers from treated preforms to withstand large temperature variations, such as are encountered in steam sterilization, without any risk of their undergoing dimensional changes.

EXAMPLES 19–20

Tests were carried out on a 1.5 liter bioriented bottles obtained from untreated PET preforms.

A pilot plant similar to that used for Examples 1–10 was employed, loading the autoclave with PET bottles.

The following chart shows the acetaldehyde concentrations of the bottles (head space method) before and after the treatment with $CO_2$.

| Test No. | 19 | 20 |
|---|---|---|
| Conditions for $CO_2$ treating the bottles: | | |
| (a) Treatment pressure (bar) | 55 | 59 |
| (b) Treatment temperature (°C.) | 40 | 50 |
| (c) Treatment duration (min.) | 15 | 5 |

Acetaldehyde concentration within the bottles before the treatment (μg/l): 2.7 2.7

Acetaldehyde concentration within the bottles after the treatment (μg/l): 0.52 0.7

It is to be understood that different embodiments of the method according to the invention may be carried out without departing from the spirit and scope of the invention.

As an example, the treatment may be simply effected by pressurizing the autoclave with carbon dioxide without maintaining a continuous gas stream. Furthermore, the treatment may be advantageously applied to polyethylene terephthalate copolymers, for example polyethylene terephthalate-isophthalate copolymer (Co PET) preforms as well.

I claim:

1. A method of reducing the acetaldehyde content and the gas permeability of the walls of polyethylene terephthalate and polyethylene terephthalate copolymer hollow articles, comprising treating said hollow articles in an autoclave containing a carbon-dioxide atmosphere at a partial pressure exceeding 50 bars and at a temperature above 31° C. for a time sufficient to obtain a substantial reduction in the acetaldehyde content and the permeability of the walls of said hollow articles.

2. A method according to claim 1, characterized in that the treatment temperature is between 31° C. and 90° C.

3. A method according to claim 1, characterized in that said atmosphere comprises carbon dioxide saturated with steam.

4. A method according to claim 1, characterized in that the hollow articles are swept by a continuous gas stream.

5. A method according to any of the preceding claims, characterized in that said hollow articles are preforms as used to produce bioriented containers by stretch-blowing such preforms.

6. A method according to any of the claims 1–4, characterized in that said hollow articles are bioriented containers.

7. A method according to claim 1, characterized in that the partial pressure of carbon dioxide exceeds 50 bars.

8. A method according to claim 2, characterized in that the treatment temperature is from 45° to 80° C.

9. A method according to claim 1, characterized in that the treatment time is from 5 minutes to 10 hours.

10. A method according to claim 9, characterized in that the treatment time is from 12 minutes to 3 hours.

* * * * *